United States Patent [19]
Hwang

[11] Patent Number: 5,628,357
[45] Date of Patent: May 13, 1997

[54] SUNSHIELD

[76] Inventor: Charles Hwang, 1714 Stoner Ave. Unit #9, Los Angeles, Calif. 90025

[21] Appl. No.: 418,956
[22] Filed: Apr. 7, 1995
[51] Int. Cl.$^6$ .................................................. B60J 3/00
[52] U.S. Cl. .......................... 160/370.21; 160/DIG. 2; 296/97.7
[58] Field of Search .................. 296/97.7, 97.8, 296/95.1; 160/370.21, DIG. 2, DIG. 3

[56] References Cited

U.S. PATENT DOCUMENTS

| | | | |
|---|---|---|---|
| 4,815,784 | 3/1989 | Zheng | 296/97.7 |
| 5,035,460 | 7/1991 | Huang | 296/95.1 |
| 5,213,147 | 5/1993 | Zheng | 296/97.7 X |
| 5,452,934 | 9/1995 | Zheng | 296/97.7 |
| 5,575,324 | 11/1996 | Hwang | 160/370.21 |

*Primary Examiner*—Joseph D. Pape
*Attorney, Agent, or Firm*—Fulwider Patton Lee & Utecht, LLP

[57] ABSTRACT

A folding sunshield having two spring loops and sunshield material which fit the edges and corners of a vehicle sunshield, with the loops being rounded at the corners and the loops being attached to edges of the sunshield material and across the intermediate portion thereof by tape.

10 Claims, 4 Drawing Sheets

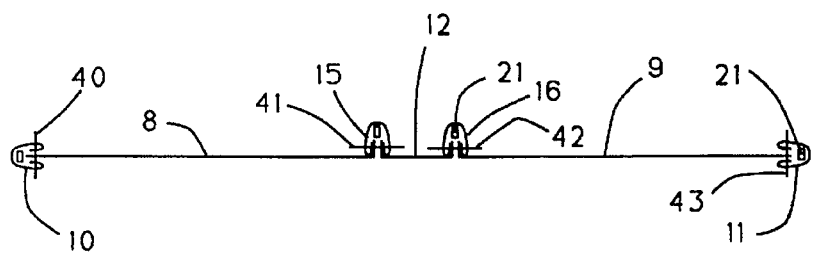
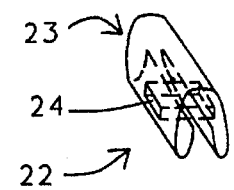
FIG. 5    FIG. 5A
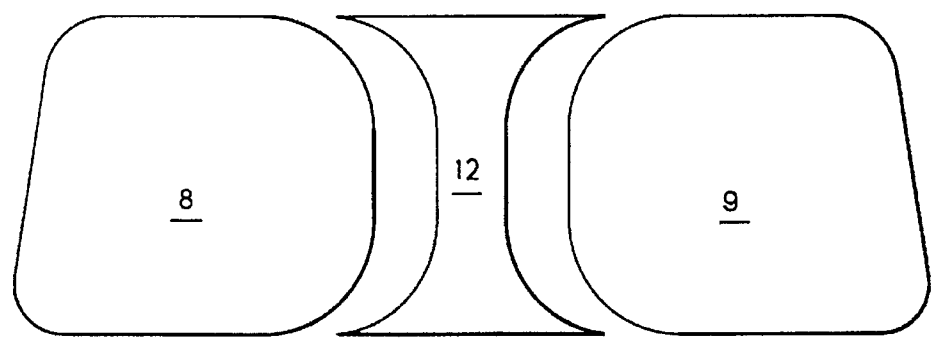
FIG. 4
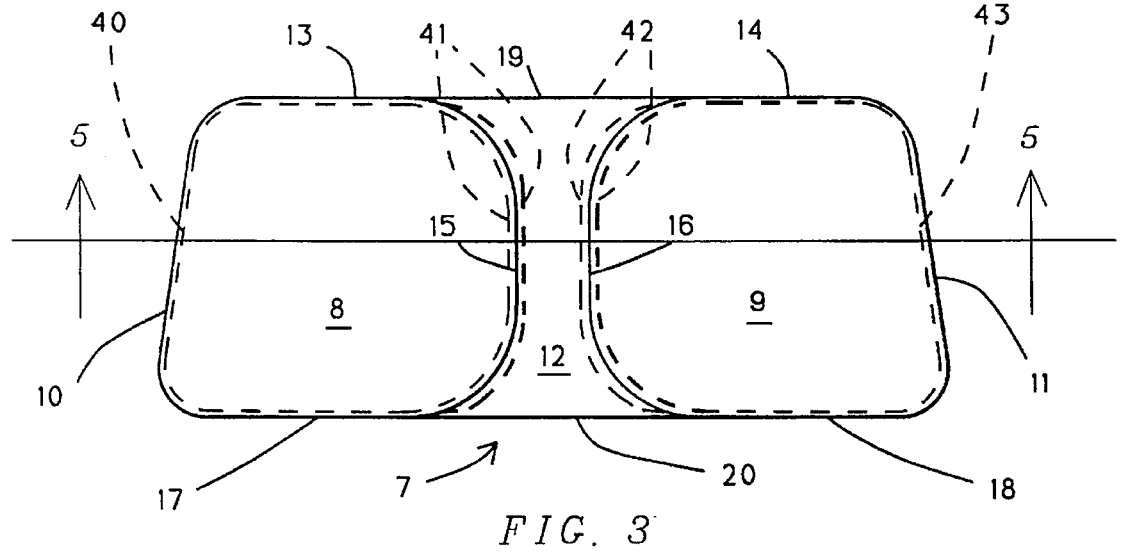
FIG. 3

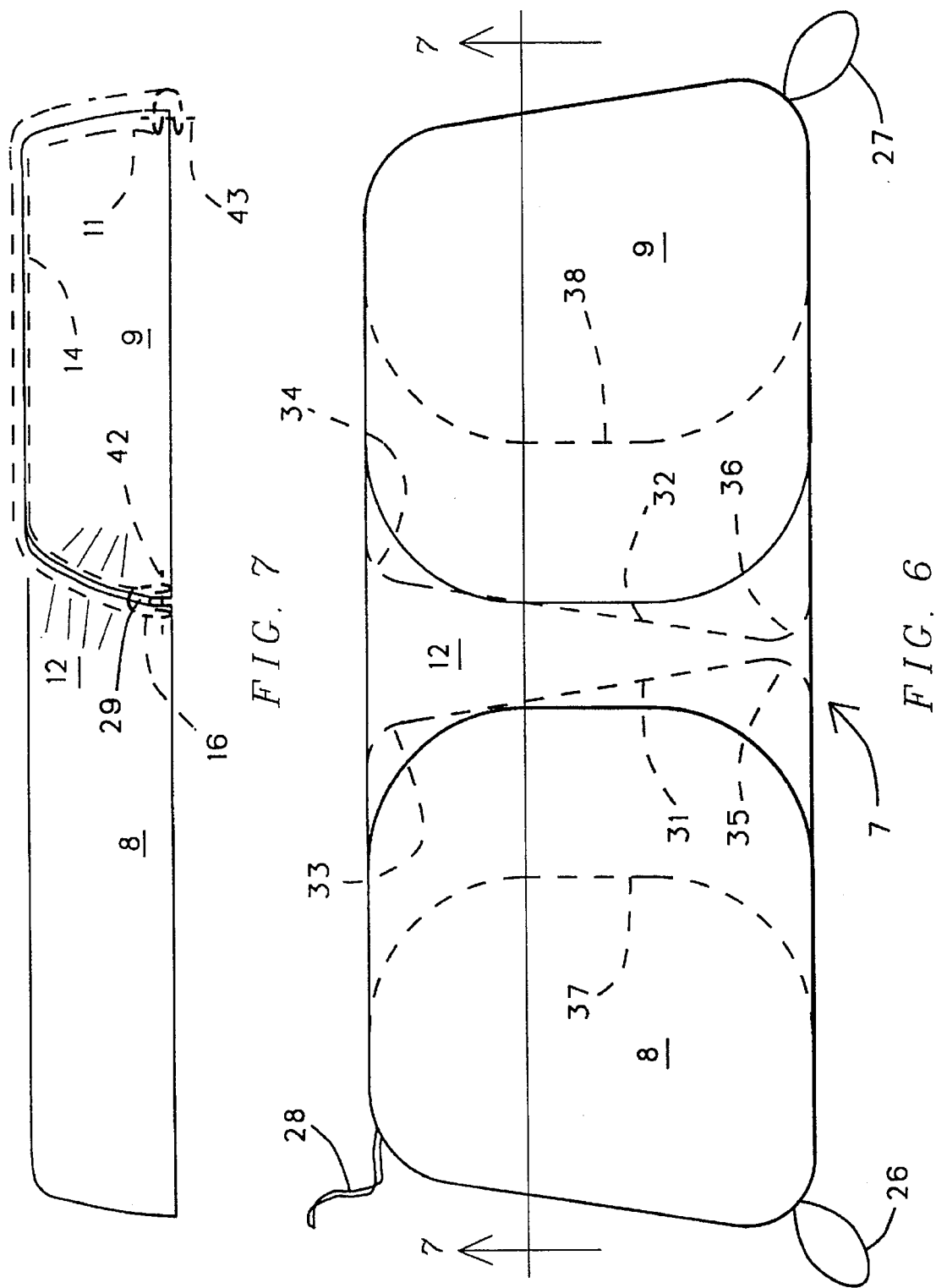

15,628,357

SUNSHIELD

This application relates to patent application Ser. No. 08/423,818, filed Apr. 19, 1995, inventor, Charles Hwang, for Sunshield and Method of Manufacture of Sunshield.

This invention relates to a folding sunshield having two or more folding loops. Such sunshield is particularly useful in vehicles although it may also be used in homes, offices and other circumstances. There is taught herein an efficient, cost-effective manner of manufacture of the sunshield. Also, the manufactured product is neat and aesthetically pleasing.

The invention, in its preferred embodiment, is a folding sunshield having a bias tape, or the like, sewn around the edge of the sunshield and across the intermediate portion of the sunshield, containing a spring loop on each of the approximately circular halves of the sunshield. A method taught herein shows how one might sew the bias tape, containing a spring loop, across the intermediate portion of the sunshield. Alternatively, old, well-known methods may be used to sew the tape across the intermediate portion of the sunshield material.

Bias tape is well-known in the sewing industry but the term herein is also intended to include any material which can be suitably folded to accomplish the structure described herein. In the preferred manufacturing method of the invention, a width of material is folded to take on the shape commonly known as "bias tape".

PRIOR ART

The prior art comprises a similar, folding automobile sunshield having two or more loops. The methods of manufacture, in the past have include laying two spring steel loops, a spaced distance apart, on a piece of sunshield material and sewing tape to the material, over the spring steel loops. The intermediate material occupying the spaced distance between the two spring steel loops serves as a hinge between the two spring steel loops so that they may be folded one on top of the other. Then, the two loops, and the entire sunshield, are twisted into a final, multiple-loop, compact configuration substantially smaller than the sunshield or either loop of the sunshield.

In one prior art method of manufacture, the tape is first sewn to the material, say, on the inside of the loops, and then the tape is sewn to the material on the outside of the loops. Thus, the spring steel loops are captured within the tape which is sewn to the material on both sides of the spring steel loops. This embodiment is most often manufactured using a single needle sewing machine making two passes around the loop, one pass inside the loop and one pass outside the loop. This two pass method requires twice as much sewing time as if a single pass could be made, as in the invention. A double-needle sewing machine could be used to make one pass in sewing both sides of the tape to the material, but double-needle machines are expensive, burdensome to operate without breaking needles and are not nearly as common as single needle machines. U.S. Pat. No. 4,815,784 for Automobile Sunshield illustrates such a method.

In another method of manufacture, the bias tape is sewn in place, in the form of two loops, leaving an opening in each loop in which to thread one end of a length of spring steel. After the spring steel is completely threaded through the bias tape loop, the ends of the spring steel are connected together, such as by crimping or otherwise. The opening in each loop may then be closed by sewing it shut.

In both of the above-mentioned methods of manufacture, an additional tape is sewn around the edge of the material, which extends beyond the spring steel loops at most or all locations. Both of the above methods requires more tape than the device of the invention.

In a third method of manufacture, a double layer of material is used for the sunshield and the spring steel loops are enclosed and sewn between the layers. The requirement for a double layer of material makes this an expensive method.

Other proposed methods have included rolling the edge of the material over the outer half of each of the spring steel loops and completing the sunshield by a tape sewn over the inner halves of the spring steel loops. U.S. Pat. No. 4,815,784 illustrates such a method in FIG. 10.

Other materials than spring steel, such as plastic, other metals or compounds thereof, have been proposed and, of course, may be used, for the spring loops.

BRIEF SUMMARY OF THE INVENTION

In the preferred embodiment of the invention, two spring steel loops are attached to the sunshield material, a spaced distance apart. The material is preferably a woven nylon. However other woven fabrics may be used as may meshes, non-woven fabric, sheet material, mylar, polypropylene and other film, of single or multiple layers, or other material which may be sewn or adhered. The loops have their outer portions at the outer ends of the sunshield material, as shown in FIG. 6 of U.S. Pat. No. 4,815,784. The spaced distance apart between the loops, that is, the intermediate portion of the sunshield material, acts as a hinge between the two spring steel loops, just as in the prior art.

To manufacture the preferred embodiment of the sunshield of the invention, a tape, into which a spring steel loop is inserted, is sewn around the outer edge of one end of the sunshield, capturing the spring steel loop within the tape, at one end of the material. The tape and the spring steel loop continue across the intermediate portion of the sunshield. Thus, the tape extends across the intermediate portion of the sunshield and continues around one edge of the sunshield.

Thus, across the intermediate portion of the sunshield, the tape is not sewn through the sunshield to the opposite side of the sunshield, as in the prior art, but is sewn across a ridge formed on one side of the sunshield.

It is, therefore, an object of this invention to provide a folding sunshield having two or more spring loops.

It is still another object of this invention to provide an economical method of manufacture of a folding sunshield.

Still another object of this invention is to provide a sunshield having loops, whose loops extend to the outer extremities of the sunshield material.

A still further object of this invention is to provide a folding sunshield that is aesthetically pleasing.

BRIEF DESCRIPTION OF THE DRAWINGS

Further objects and features will become apparent from the following description in which:

FIG. 3 is a view of the sunshield of the invention.

FIG. 4 is a view of the sunshield material, cut into three portions in one process of manufacture.

FIG. 5 is a cross-section view taken on line 5—5 of FIG. 3 showing the two ridges in the intermediate portion of the sunshield and how the tape is sewn across the two ridges and the two ends of the sunshield and how the tape is sewn over the edges of the ends.

FIG. 5A is a view of a jig used in sewing the sunshield.

FIG. 6 is a view of the sunshield of the invention.

FIG. 7 is a partial perspective view taken on the line 7—7 in FIG. 6, showing an alternate method of manufacture.

DETAILED DESCRIPTION

Figure 1:
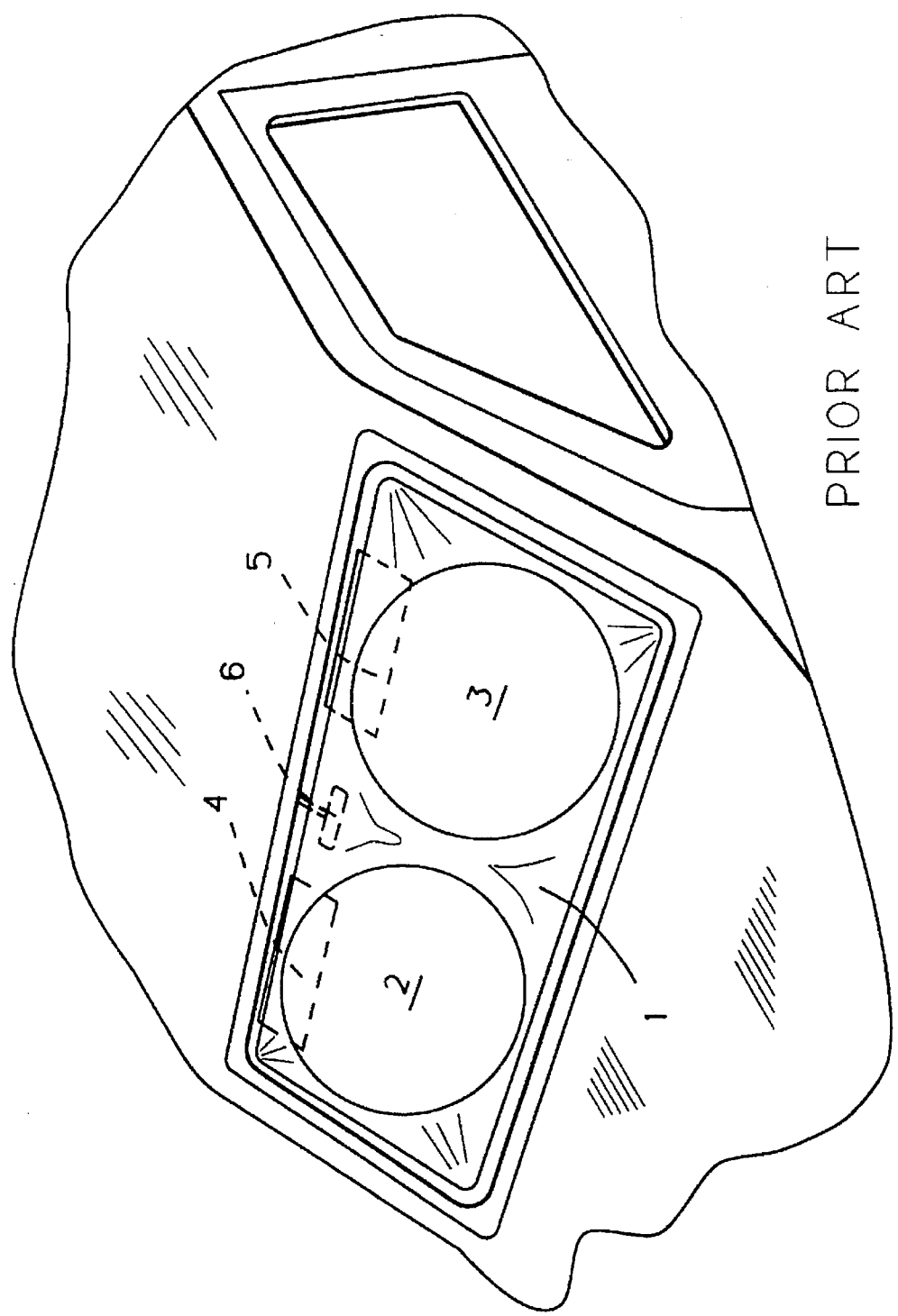
FIG. 1 is a view of a prior art sunshield in the windshield of an automobile.

In FIG. 1 a prior art sunshield 1 having spring loops 2 and 3 are shown in the windshield of an automobile. Such prior art sunshield may be assisted in being held in place by the visors 4 and 5 and mirror 6.

Figure 2:
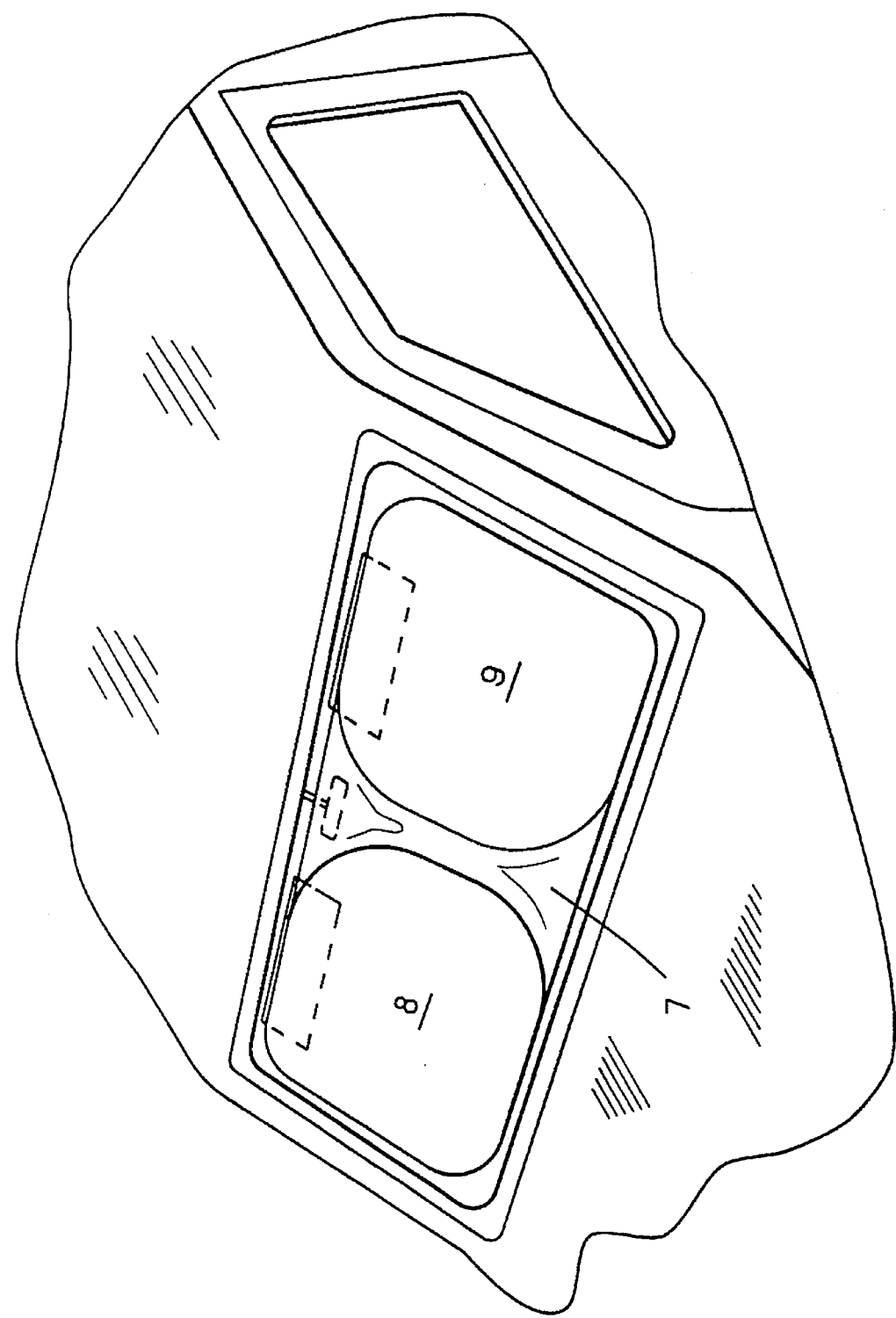
FIG. 2 is a view of the sunshield, in accordance with the invention, in the windshield of an automobile.

FIG. 2 is a view of the sunshield 7, having loops 8 and 9 in accordance with the invention, in the windshield of an automobile. It may be seen that the sunshield of the invention fits the left and right sides of the windshield as well as the four corners of the windshield. The corners of the sunshield, both the material and the spring loops, are somewhat rounded so spring loops, which can be twisted and folded as in prior art U.S. Pat. No. 4,815,784, can be utilized in the sunshield.

In FIG. 3, a sunshield 7, a sunshield of the invention, has bias tape 10 and 11 sewn around the edges of the left and right ends of the sunshield. FIG. 3 illustrates that loop 8 has a rounded obtuse angle at its upper corner and a rounded acute angle at the lower corner of its left edge and loop 9 has a rounded obtuse angle at its upper corner and a rounded acute angle at the lower corner of its right edge. It is noted that the bias tapes 10 and 11 continue as bias tapes 13 and 14 along the top edges of the loops 8 and 9. Tapes 13 and 14 then continue as tapes 15 and 16 across the intermediate portions of the loops 8 and 9, respectively. The bias tapes 17 and 18 continue along the bottom edges of the sunshield, completing each of the loops 8 and 9 within which a spring loop member is contained. That is, the each spring loop is contained within the bias tape on loops 8 and 9. Bias tape 19 is also sewn along the top edge of the intermediate portion 12. The ends of such bias tape 19 is sewn and terminated shortly within either the bias tapes 13 and 14 or bias tapes 15 and 16, or at the covergence of such tapes. Likewise, bias tape 20 is also sewn along the bottom edge of the intermediate portion 12. The ends of such bias tape 20 is sewn and terminated shortly within either the bias tapes 17 and 18 or bias tapes 15 and 16, or at the convergence of such tapes.

Stiching 40 and 43, shown in dotted lines, attach bias tapes 10 and 11 to the left and right ends of loops 8 and 9. Such stitching 40 and 43, shown in dotted lines, also attach the bias tapes 13, 14, 17 and 18 to the top and bottom edges of the loops 8 and 9 of the sunshield 7. Such stitching 40 and 43 is through the sunshield material, from the top to the bottom of the sunshield material. Stitching 41 and 42 and bias tapes 15 and 16, across the intermediate portion 12, are, preferably, continuations of the stitching 40 and 43 and bias tapes 10 and 11 around the edges of the left and right ends of loops 8 and 9. That is, in the preferred embodiment, loop 9 is encircled by a continuous bias tape and continuous stitching and loop 8 is likewise encircled by continuous bias tape and continuous stitching. Loops 8 and 9 thus appear to stand out from the sunshield 7, particularly across the intermediate portion 12 of the sunshield.

To complete the perimeter of the sunshield, entirely encircling it by bias tape, bias tapes 19 and 20 are sewn to the top and bottom edges of the intermediate portion 12 of the sunshield and terminated as previously explained.

It is to be appreciated that while a single bias tape may be sewn around loop 8 and a single bias tape may be sewn around loop 9, as expedient, such bias tape may be pieced together from two or more sections of bias tape and such stitching may be terminated and resumed at various locations. A ⅜" bias tape, that is, one which forms a ⅜" border on the sunshield, has been found suitable and aesthetically pleasing. Such bias tape is constructed of material approximately 1 ⅜" wide. When sewn in place the bias tape is ⅜" wide and has a margin of a ¼" or slightly more tucked under and inside the tape, along its length on both its sides, thus making it what is commonly called "bias tape".

It is to be appreciated that a sunshield material of a thermoplastic film and a bias tape of thermoplastic film might be heat sealed rather than sewn. Instead of sewing, glue or other adhesive may be used to hold a bias tape and the edges of the sunshield material in place.

The spring loop of the invention is preferably made of zinc-coated, spring steel and in cross-section is a rectangle approximately ⅛" high and approximately 1/32" or less in width. A width of approximately 1/48" is commonly used. Of course, stronger or weaker spring steel may require somewhat different dimensions to appropriately hold the sunshield in place and to be easily folded and twisted for storage. The dimensions would be inverse to the strength of the steel, that is, as the steel is stronger, the dimensions may be smaller.

FIG. 4 is a view of the sunshield material, cut into three portions, loops 8 and 9 and intermediate portion 12, in the process of manufacture. Such three portions are then brought together to form the ridges shown in cross-section in FIG. 5. Such ridges may then be sewn together through the bias tapes with the bias tapes overlying the ridges.

Manufactured in this manner, the two loops of the sunshield create a pleasing, workmanlike, artistic appearance, making the two loops 8 and 9 pleasingly seeming to "stand out" against the background of the sunshield material.

FIG. 5 is a cross-section view taken on line 5—5 of FIG. 3 showing the two ridges formed by the intermediate portion 12 of the sunshield and the loop portions 8 and 9 and how the tapes 15 and 16 are sewn overlying, or across, the two ridges. Tapes 15 and 16 are shown relatively enlarged for clarity. Such tapes continue to the top and bottom edges of the sunshields, as shown in FIG. 3, and complete the two loops 8 and 9 by being sewn, shown as tapes 10 and 11, which are also shown relatively enlarged for clarity, in FIG. 5, around the edges of the ends of the sunshields. Stitching 40, 41, 42 and 43 illustrate how the tapes are sewn to the edges, that is, around the outside of the edges of the sunshield material and around the outside of the corners of the sunshield material, and to the ridges of the sunshield material. Of course, if ridges are not used across the intermediate portion of the sunshield, the spring loop is simply attached to the top surface of the sunshield material by tape.

In the preferred embodiment, the spring loop 21 is caught and held within the tape as it is sewn in place across the intermediate portion of the sunshield as well as when the tape is sewn in place around the edges of the left and right ends of the loops 8 and 9. Alternatively to including the spring loop into the tape at the same time the tape is sewn on the ridges and edges, a length of spring loop material may be fed into the tape loop, after it is sewn in place, through a retained or prepared opening in the tape loop. The length of spring loop material is then connected at its ends to form a loop and the tape opening is then closed over the spring loop. Various means of connecting the ends of the spring loop together may be used such as by crimping the ends together, butt-joining, overlap-joining, welding, soldering, brazing or by other suitable joining methods or means. It is to be appreciated that the tape may simply be sewn on the top surface of the sunshield material, across the intermediate portion of the sunshield, not necessarily to ridges as shown in FIGS. 5 and 5A. In any event, in the preferred embodiment, as can be seen by reference to FIG. 3, tape 15 will transition from being sewn to the top surface of the sunshield material, to tapes 13, 10, and 17, which are sewn around the edge of the sunshield material, to form loop 8. Likewise, tape 16 will transition from being sewn to the top surface of the sunshield material, to tapes 14, 11 and 18 which are sewn to the edge of the sunshield material, to form loop 9. As mentioned previously, the tapes 15, 13, 10 and 17 of loop 8 may be sewn or pieced together as a single tape or in any number of segments to form the loop 8. The same is true, of course, as to tapes 16, 14, 11, and 18 of loop 9.

FIG. 5A is a view of a jig 22, used in one method of sewing the sunshield. The edges of intermediate portion 12 and loop 9 of sunshield material, for example, of FIG. 4, are fed into the end 23 of jig 22 and emerge from the near end of jig 22. The bias tape material is also fed into end 23 of the jig 22 at the same time and formed into a bias tape by the jig. The sewing needle passes through window 24 in the jig 22, catching both the edge of intermediate portion 12 and the edge of loop 9. The spring loop 21 is preferably also be fed into jig 22 at the same time, so that the spring loop is captured within the bias tape as it is sewn in place.

Of course, the sewing needle may be located to sew the bias tape and sunshield material subsequent to the bias tape and the sunshield material passing through jig 22, that is, after the near end of the jig 22, after the bias tape and material are formed in place by the jig 22.

FIG. 6 is a view of the sunshield 7 of the invention having elastic loops 26 and 27 for holding the sunshield when it is folded and one or more attaching means such as strap 28. Straps may be used to tie the sunshield in place or hold it in place by extending through a closed window or between a closed door and its frame.

Loops 26 and 27 for holding the sunshield when folded and twisted for storage, may be tape, cord or elastic, as desired, and may be connected to the corners, sides or edges of the sunshield 7. Also, strap 28 which may also be a tape, cord, elastic or other flexible material, and similar straps may be attached to the corners, sides or edges of the sunshield 7.

Also, the loops 8 and 9 of the sunshield may have other configurations. Dotted lines 31 and 32, representing bias tape including therein the spring loop, which is not shown, illustrate the embodiment in which loops 8 and 9 are comprised of a long, linear line running across the intermediate portion 12 of the sunshield 7. Such dotted lines 31 and 32 then end in curves 33, 34, 35 and 36 near the top and bottom edges of the sunshield 7.

Another configuration which results in smaller loops, when the sunshield 7 is folded and twisted into its smallest shape, is illustrated by dotted lines 37 and 38, representing the bias tape, within which is disposed the spring loop 21, which is shown in FIG. 5, but not shown in FIG. 6, of loop 9 and a corresponding spring loop, which is not shown, of loop 8. In this embodiment, the intermediate portion 12 is quite large and may be folded away inside the two loops 8 and 9, as they are formed into their smallest configuration.

FIG. 7 is a partial perspective view taken on the line 7—7 in FIG. 6, showing an alternate method of manufacture. In this method of manufacture, the intermediate portion 12 is not cut away from the loops 8 and 9 as shown in FIG. 4, but, rather, the portion 12 is gathered together with a portion of loop 9 to form a ridge 29, which may or may not be then sewn to hold it for later sewing a bias tape 16 thereover, as shown in FIG. 5. Stiching 42 illustrates the location of the stitches as being horizontally through the material, across the intermediate portion 12 of the sunshield. Thus, bias tape 16, shown in dotted lines, is, in the intermediate portion 12 of the sunshield, sewn over a gathered, or formed, ridge 29. As described previously, bias tape 16, shown in dotted lines, is preferably a continuation of bias tape 14 and bias tape 11, both shown in dotted lines in FIG. 7. The stitching of such bias tapes 16, 14, and 11 to the loop 9 is shown and explained in connection with FIGS. 3 and 5.

In FIG. 7, spring loop 21 is not shown, but it is included within the bias tapes 11, 14, 16 and 18 shown in FIG. 3. A similar spring loop, not shown, is included within the bias tapes 10, 13, 15 and 17.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular forms herein shown and described except insofar as determined by the scope of the appended claims.

I claim:

1. A folding sunshield comprised of a sunshield material having left and right edges and wherein is included first and second spring loops attached to said sunshield material on respective approximate left and right halves of said material, said spring loops being unattached to each other, an intermediate portion of said material between said spring loops acting as a hinge for folding said two loops on top of each other for further folding, or twisting, said sunshield comprised of;

said left and right edges of said sunshield material being cut to the approximate shape of the left and right edges of a window, but having rounded corners;

said first and second spring loops being shaped to fit along said left and right edges of said sunshield material;

said first and second spring loops being attached to said sunshield material by first and second tapes attached along said left and right edges of said sunshield material and across said intermediate portion of said sunshield material.

2. The sunshield of claim 1 wherein said tape at said left edge is attached to opposite sides of said sunshield material and said tape at said right edge is attached to opposite sides of said sunshield material and wherein said tapes are attached to one side of said sunshield material across said intermediate portion of said sunshield material.

3. A folding sunshield for a vehicle windshield having a left side having a left top corner and a left bottom corner and a right side having a right top corner and a left bottom corner, said sunshield being comprised of a sunshield material having a left edge fitted to said left side and said left corners and a right edge fitted to said right side and said right corners; and wherein is included a first spring loop fitted to said left side and said left corners and attached to said sunshield material along said left edge and said left corners of said sunshield material by a tape; and wherein is included a second spring loop fitted to said right side and said right corners and attached to said sunshield material along said right edge and said right corners of said sunshield material by a tape; and wherein said spring loops are attached to said sunshield material a spaced distance apart from each other, thereby providing an intermediate portion of said sunshield material between said spring loops; and wherein said two spring loops are foldable on top of each other for twisting into smaller loops.

4. The sunshield of claim 3 wherein said loops and said sunshield material are fitted to said corners by being rounded at said corners.

5. The sunshield of claim 3 wherein said first spring loop is attached to said sunshield material by said tape being attached around said left edge and around the outside of said left corners of said sunshield material; and wherein said second spring loop is attached to said sunshield material by said tape being attached around said right edge and around the outside of said right corners of said sunshield material.

6. The sunshield of claim 5 wherein said first spring loop is attached to said sunshield material across the intermediate portion thereof, by a tape attached to said material over said first spring loop; and wherein said second spring loop is attached to said sunshield material across said intermediate portion thereof, by a tape attached to said material over said second spring loop.

7. The sunshield of claim 3 wherein said tape attached over said first spring loop is attached to the top surface of said sunshield material across the intermediate portion thereof and is attached by a tape around the outside of the edge of said sunshield material around the remainder of said loop; and wherein said tape attached over said second spring loop is attached to the top surface of said sunshield material across the intermediate portion thereof and is attached by a tape around the outside of the edge of said sunshield material around the remainder of said loop.

8. The sunshield of claim 3 wherein said first spring loop has a left corner which is a rounded obtuse angle and a left corner which is a rounded acute angle; and wherein said second spring loop has a right corner which is a rounded obtuse angle and a right corner which is a rounded acute angle.

9. The sunshield of claim 3 wherein said tapes are attached to said material by being sewn to said material, in which said tapes are sewn over the left and right edges and the left and right corners of said sunshield material; and wherein said tapes are sewn on top of said material across said intermediate portion thereof.

10. The sunshield of claim 3 wherein said spring loops are substantially smaller in diameter than the width of said intermediate portion.

* * * * *